United States Patent
Chien et al.

(10) Patent No.: US 7,802,044 B2
(45) Date of Patent: Sep. 21, 2010

(54) PIN SHARING DEVICE AND METHOD THEREOF FOR A UNIVERSAL ASYNCHRONOUS RECEIVER/TRANSMITTER MODULE AND A UNIVERSAL SERIAL BUS MODULE

(75) Inventors: Wen-Ying Chien, Hsinchu (TW); Chih-Pin Sun, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 140 days.

(21) Appl. No.: 12/343,508

(22) Filed: Dec. 24, 2008

(65) Prior Publication Data

US 2010/0161860 A1 Jun. 24, 2010

(51) Int. Cl.
*H05K 7/10* (2006.01)
(52) U.S. Cl. ............................ 710/305; 710/301
(58) Field of Classification Search .......... 710/106, 710/301–304, 305
See application file for complete search history.

(56) References Cited

U.S. PATENT DOCUMENTS

| | | | |
|---|---|---|---|
| 5,708,799 A * | 1/1998 | Gafken et al. | 710/301 |
| 5,752,082 A * | 5/1998 | Staples | 710/62 |
| 5,822,547 A * | 10/1998 | Boesch et al. | 710/302 |
| 5,909,596 A * | 6/1999 | Mizuta | 710/63 |
| 6,452,402 B1 | 9/2002 | Kerai | |
| 6,509,659 B1 | 1/2003 | Carroll et al. | |
| 6,792,494 B2 * | 9/2004 | Bennett et al. | 710/302 |
| 6,857,038 B2 * | 2/2005 | Liu et al. | 710/301 |
| 7,069,369 B2 * | 6/2006 | Chou et al. | 710/301 |
| 7,103,381 B1 | 9/2006 | Wright et al. | |
| 7,197,578 B1 * | 3/2007 | Jacobs | 710/14 |
| 7,203,785 B2 * | 4/2007 | Bennett et al. | 710/302 |
| 7,237,049 B2 * | 6/2007 | Kang et al. | 710/104 |
| 7,493,437 B1 * | 2/2009 | Jones et al. | 710/301 |
| 2003/0236934 A1 | 12/2003 | Park | |
| 2005/0021895 A1 * | 1/2005 | Son et al. | 710/301 |
| 2009/0153211 A1 * | 6/2009 | Hendin et al. | 327/198 |

* cited by examiner

*Primary Examiner*—Paul R Myers
(74) *Attorney, Agent, or Firm*—Winston Hsu

(57) ABSTRACT

A pin sharing device for a UART module and a USB module includes a first port coupled to a first terminal of the USB module, a second port, a first multiplexer, a second multiplexer, a first switch and a second switch. The first multiplexer is utilized for selectively coupling the first port or a signal generator to a receiving terminal of the UART module. The second multiplexer is utilized for selectively coupling a transmitting terminal of the UART module or a second terminal of USB module to the second port. The first switch and the second switch are utilized for pulling up voltage level of the first port and voltage level of the second port when the UART module and the USB module is not coupled to any UART device or USB host device. Therefore, a number of pins for the UART module and the USB module can be reduced.

30 Claims, 3 Drawing Sheets

PIN SHARING DEVICE AND METHOD THEREOF FOR A UNIVERSAL ASYNCHRONOUS RECEIVER/TRANSMITTER MODULE AND A UNIVERSAL SERIAL BUS MODULE

BACKGROUND OF THE INVENTION

The present invention relates to a pin sharing device and a method thereof, and more particularly, to a pin sharing device and method for a Universal Asynchronous Receiver/Transmitter (UART) module and a Universal Serial Bus (USB) module.

Integrated circuits (ICs) are used in almost all electronic equipments today. With development of the IC manufacturing process, size of an IC chip can be smaller for realizing cost reduction. At the same time, more and more functions are implemented in a single IC chip which requires more input/output (I/O) pins on the IC. The number of I/O pin counts becomes the design limit for reducing the size of the IC chip. Therefore, it is a challenge for an IC designer to properly assign each input and output pin to minimize the number of pins.

Generally, a baseband IC in a mobile phone includes a UART module and a USB module for data transmission between the mobile phone and a peripheral device or a host computer. Please refer to FIG. 1, which is a schematic diagram of a UART module 102 and a USB module 104 in a baseband IC 10. Except power and ground ports, the UART module 102 includes ports UTXD, URXD, UCTS and URTS. UTXD and URXD are used for data transmission, whereas UCTS and URTS are used for signaling control, which are not shown in FIG. 1. The USB module 104 includes two ports DP and DM both for data and command transmission. As shown in FIG. 1, transmission ports for the UART module 102 and the USB module 104 are independent, and thereby the baseband IC 10 has to provide four I/O pins for UTXD, URXD, DP and DM, which is not efficient for the limited number of pins.

On the other hand, due to the small size of the mobile phone, most of the mobile phones only have one connector so the UART function and the USB function will not be activated at the same time. Therefore, a system designer may use an analog switch for selecting the UART ports (UTXD and URXD) or the USB ports (DP and DM) to connect to the connector, which helps the UART module and the USB module share common pins on the connector. However, the analog switch results in signal distortion easily for USB 2.0 high speed transmission.

SUMMARY OF THE INVENTION

It is therefore a primary objective of the claimed invention to provide a pin sharing device and a method thereof for a Universal Asynchronous Receiver/Transmitter (UART) module and a Universal Serial Bus (USB) module, for reducing a number of pins on the IC.

According to an embodiment of the present invention, a pin sharing device for a UART module and a USB module is disclosed. The pin sharing device comprises a first port coupled to a first terminal of the USB module, a second port, a first multiplexer, a second multiplexer, a first switch and a second switch. The first multiplexer is utilized for selectively coupling the first port or a signal generator to a receiving terminal of the UART module according to a first selecting signal. The second multiplexer is utilized for selectively coupling a transmitting terminal of the UART module or a second terminal of the USB module to the second port according to a second selecting signal. The first switch is utilized for selectively coupling the first port to a first voltage generator according to a first switch signal. The second switch is utilized for selectively coupling the second port to a second voltage generator according to a second switch signal.

According to another embodiment of the present invention, a pin sharing method for a UART module and a USB module is disclosed. The pin sharing method is utilized for sharing a first port and a second port, wherein the first port is coupled to a first terminal of the USB module. The pin sharing method comprises: selectively coupling the first port or a signal generator to a receiving terminal of the UART module according to a first selecting signal; selectively coupling a transmitting terminal of the UART module or a second terminal of the USB module to the second port according to a second selecting signal; and selectively pulling up voltage level of the first port and voltage level of the second port.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

Figure 1:
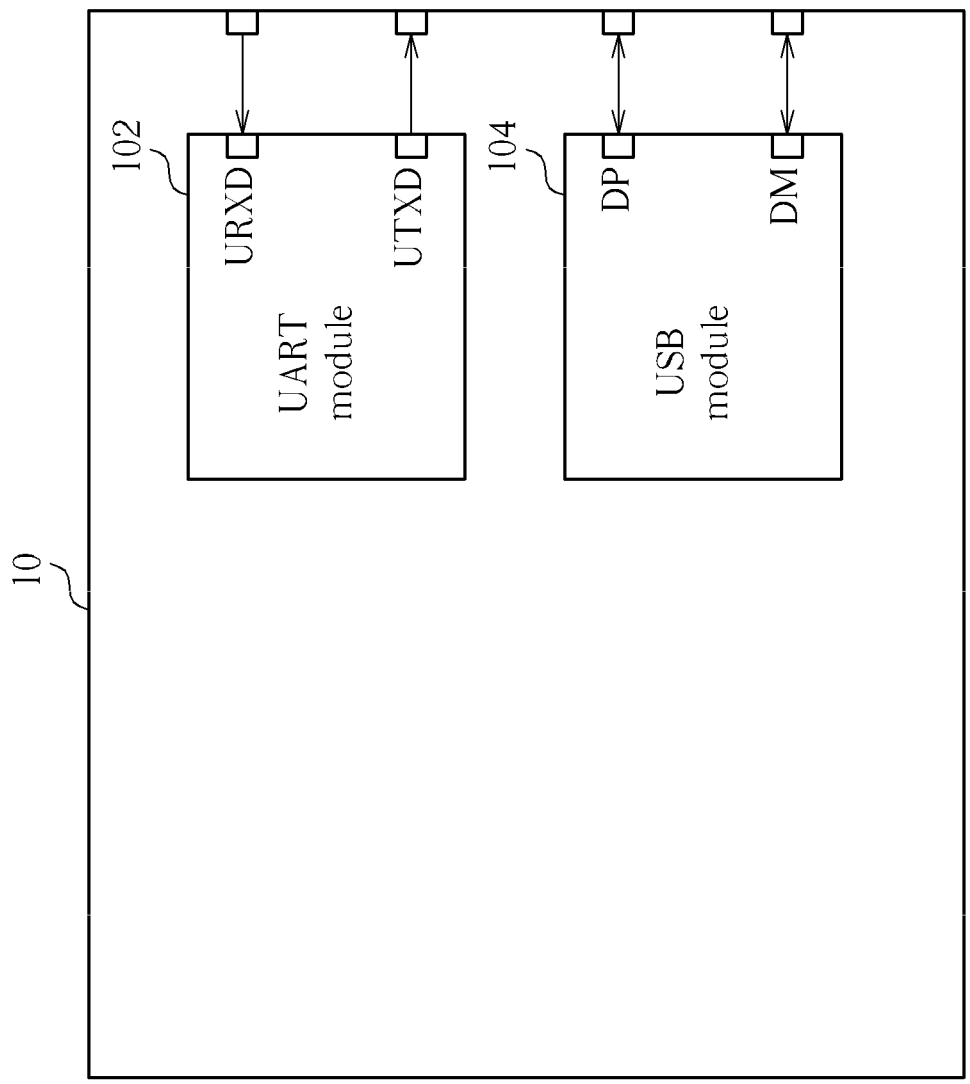
FIG. 1 is a schematic diagram of a UART module and a USB module in a baseband IC according to the prior art.
Figure 2:
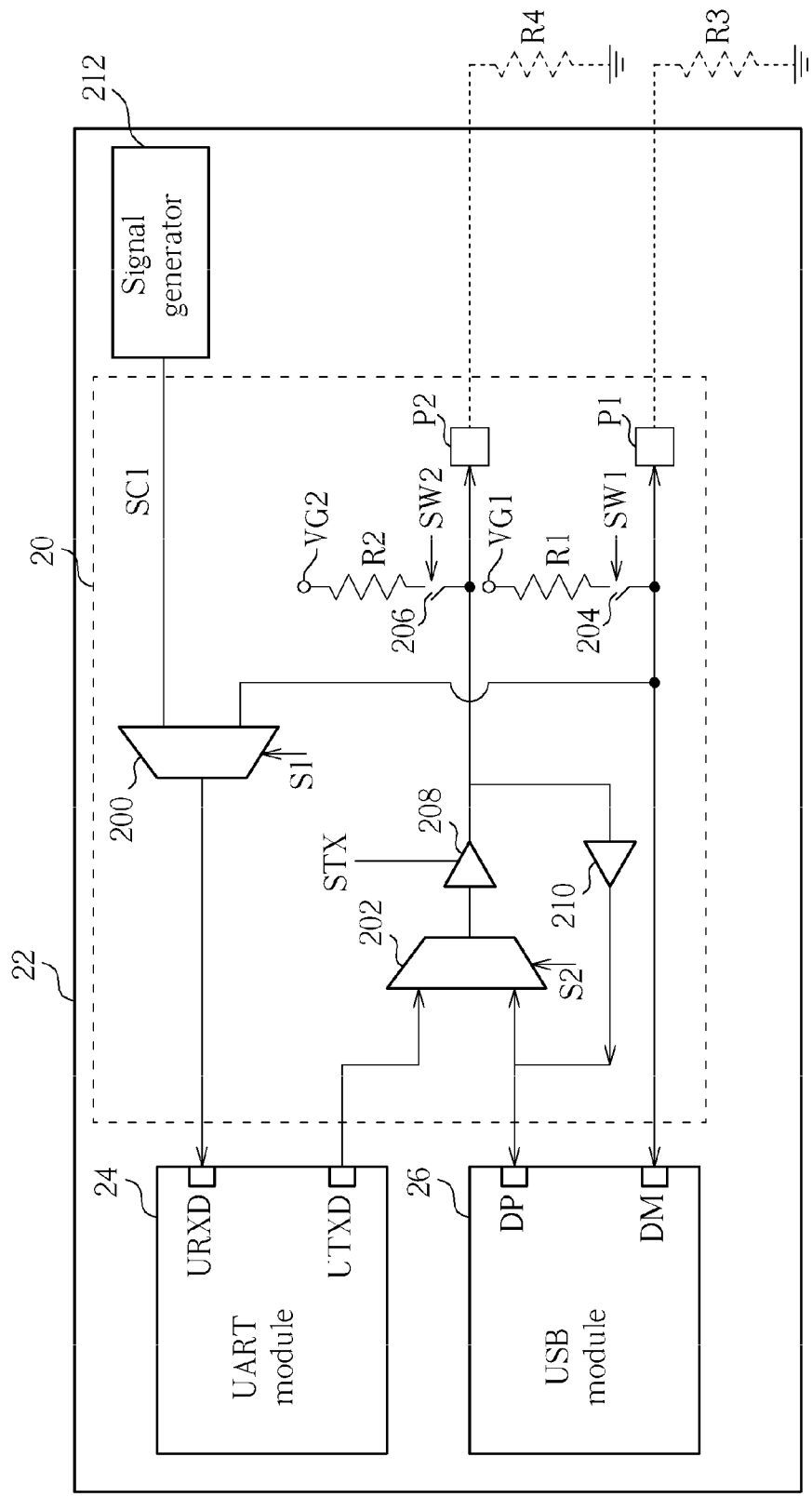
FIG. 2 is a schematic diagram of a pin sharing device according to an embodiment of the present invention.

Please refer to FIG. 2, which is a schematic diagram of a pin sharing device 20 according to an embodiment of the present invention. The pin sharing device 20 is utilized for a Universal Asynchronous Receiver/Transmitter (UART) module 24 and a Universal Serial Bus (USB) module 26 in a baseband IC 22, for sharing common pins of the baseband IC 22 between the UART module 24 and the USB module 26. As shown in FIG. 2, in the baseband IC 22, the UART module 24 comprises a UART receiving terminal URXD and a UART transmitting terminal UTXD. Communication for the UART module 24 may be full duplex (both transmitting and receiving at the same time) or half duplex (takes turns transmitting and receiving). The USB module 26 comprises two USB terminals DP and DM, and uses half duplex differential signaling. Note that, the UART and USB functions together occupy only 2 I/O pins of the baseband IC 22 via the pin sharing device 20.

The pin sharing device 20 comprises a first port P1, a second port P2, a first multiplexer 200, a second multiplexer 202, a first switch 204, a second switch 206, a first buffer 208, a second buffer 210, and resistors R1 and R2. The first port P1 is coupled to the USB terminal DM.

Briefly, the UART module 24 and the USB module 26 share the first port P1 and the second port P2 via the first multiplexer 200 and the second multiplexer 202. The first multiplexer 200 is coupled to the first port P1, a signal generator 212 and the UART receiving terminal URXD, for selectively coupling the first port P1 or the signal generator 212 to the UART receiving terminal URXD according to a first selecting signal S1. In other words, the first selecting signal S1 controls the first multiplexer 200 to switch between the UART path and the USB path. Note that, according to the current UART specification, the UART receiving terminal URXD shall be pulled high when the UART module 24 is not coupled to a UART device, so the signal generator 212 is utilized for generating a control signal SC1 of a high voltage level, for keeping the UART receiving terminal URXD from floating and being affected by USB signal when the USB module 26 is coupled to a USB host device. An embodiment of the signal generator 212 is a voltage source or a power supply.

The second multiplexer 202 is coupled to the second port P2, the UART transmitting terminal UTXD and the USB terminal DP, for selectively coupling the UART transmitting terminal UTXD or the USB terminal DP to the second port P2 according to a second selecting signal S2. In other words, the selecting signal S2 controls the second multiplexer 202 to switch between the UART path and the USB path. In fact, the second multiplexer 202 is coupled to the second port P2 via the first buffer 208, which is described hereafter.

Note that the pin sharing device 20 is one of embodiments in which the USB terminal DM is coupled to the first port P1 and the USB terminal DP is coupled to the second port P2. In another embodiment, the USB terminal DP can be coupled to the first port P1 and the USB terminal DM can be coupled to the second port P2. In addition, the first selecting signals S1 and the second selecting signals S2 are used to control the first multiplexer 200 and the second multiplexer 202 to switch at the same time. The first selecting signals S1 and the second selecting signals S2 can be different signals or equal to each other. In another embodiment, it is preferable to combine the first selecting signals S1 and the second selecting signals S2 to a single selecting signal and to use a UART mode select signal as the selecting signal.

The first switch 204 and the second switch 206 are utilized for selectively pulling the first port P1 and the second port P2 to a high voltage level. The first switch 204 is coupled to a voltage generator VG1, the USB terminal DM and the first port P1, for selectively coupling the first port P1 to the voltage generator VG1 according to a first switch signal SW1. Similarly, the second switch 206 is coupled to a voltage generator VG2, the second multiplexer 202 and the second port P2, for selectively coupling the second port P2 to the voltage generator VG2 according to a second switch signal SW2. In this embodiment, the first switch signal SW1 can be equal to a UART mode select signal, and the second switch signal SW2 can be equal to the UART mode select signal or equal to a result of logic AND operation of the UART mode select signal and the inverse of a UART transmitting enable signal.

The resistor R1 is coupled between the first switch 204 and the voltage generator VG1, and the resistor R2 is coupled between the second switch 206 and the voltage generator VG2. The resistors R1 and R2 are pull-up resistors with resistance large enough comparing to 15K-ohm resistor R3 or R4 in the USB host device, in light of the USB specification. For example, the resistors R1 and R2 are 100K ohm resistors.

The first buffer 208 is a tri-state buffer coupled between the second multiplexer 202 and the second port P2, and is controlled by a control signal STX. The control signal STX is generated according to the first selecting signal S1, the second selecting signal S2, a USB transmitting enable signal indicating whether the USB module 26 is transmitting, and the UART transmitting enable signal indicating whether the UART module 24 is transmitting. The second buffer 210 is coupled between the USB module 26 and the second port P2. Note that, the first buffer 208 and the second buffer 210 are already existed components in the USB module 26, and the present invention uses them to switch between transmitting and receiving paths of USB signals.

Operations of the pin sharing device 20 are described as different modes as follows. When the UART module 24 and the USB module 26 are in a default mode in which the UART module 24 is not coupled to a UART device and the USB module 26 is not coupled to a USB host device, the first multiplexer 200 couples the UART receiving terminal URXD to the first port P1 and the second multiplexer 202 couples the UART transmitting terminal UTXD to the second port P2. That is, the first multiplexer 200 and the second multiplexer 202 is switched to the UART path in the default mode. At the same time, the first switch 204 and the second switch 206 are switched on, so that the first port P1 and the second port P2 are pulled high. The control signal STX controls the buffer 208 to output high impedance or output the input signal of the buffer 208, which is no signal in default mode.

When the UART module 24 is coupled to a UART device, also called a UART mode, the first multiplexer 200 couples the UART receiving terminal URXD to the first port P1; the second multiplexer 202 couples the UART transmitting terminal UTXD to the second port P2. When the UART module 24 is transmitting only or both transmitting and receiving at the same time, the control signal STX controls the buffer 208 to output the UART transmitting signal to the second port P2; the first switch 204 is switched on; and the second switch 206 is switched on or switched off. On the other hand, when the UART module 24 is receiving only, the control signal STX controls the buffer 208 to output the UART transmitting signal to the second port P2 or to output high impedance; the first switch 204 and the second switch 206 are switched on.

When the USB module 26 is coupled to a USB host device, also called a USB mode, the first multiplexer 200 couples the UART receiving terminal URXD to the signal generator 212 which keeps the UART receiving terminal URXD in a high voltage level from floating and being affected by a USB signal; the second multiplexer 202 couples the USB terminal DP to the second port P2 via the first buffer 208; and the USB terminal DM is always coupled to the first port P1. If the USB module 26 is transmitting, the control signal STX controls the buffer 208 to output the USB DP signal to the second port P2; otherwise, if the USB module 26 is receiving, the control signal STX controls the buffer 208 to output high impedance and the USB DP signal is received from the second port P2 via the second buffer 210. Whether the USB module 26 is transmitting or receiving, the first switch 204 and the second switch 206 are switched off.

Operations of an electronic device using the pin sharing device 20 when a USB host device is plugged in, as an example, are as follows. When the UART module 24 and the USB module 26 are in the default mode, the first multiplexer 200 and the second multiplexer 202 operate in the UART path; and the first port P1 and the second port P2 are pulled high via the first switch 204 and the second switch 206. Then, when the electronic device is plugged into the USB host device, such as a computer, the USB host device first pulls down the first port P1 and the second port P2 via 15K ohm resistors R3 or R4 as shown in FIG. 2. At this time, the USB host does not detect there is the electronic device plugged in because the first port P1 and the second port P2 are pulled down.

However, the baseband IC 22 receives a charger interrupt from a power terminal of the USB module 26, VBUS (which is not shown in FIG. 2). In an embodiment, the power terminal of the USB module 26 (VBUS) is 5V. After receiving the charger interrupt, the baseband IC 22 switches the first switch 204 and the second switch 206 off according to the first switch signal SW1 and the second switch signal SW2, and switches the first multiplexer 200 and the second multiplexer 202 to the USB path according to the first selecting signal S1 and the selecting signal S2. In this situation, the UART receiving terminal URXD is pulled high according to the control signal SC1 from being affected by the USB signal. The USB terminal DP is coupled to the second port P2 via the second multiplexer 202 and the first buffer 208 (or via the second buffer 210 directly), and the normal USB function is then turned on. Note that, a 1.5K ohm pull-up resistor (which is not shown in FIG. 2) is usually coupled to the USB terminal DP according to the USB specification. When the electronic device is plugged out, the normal USB function will be first turned off by software. The baseband IC 22 switches the first switch 204 and the second switch 206 on again, switches the first multiplexer 200 and the second multiplexer 202 as in the default mode, and waits for a UART device or a USB host device to plug in again.

In summary, the UART module 24 and the USB module 26 share the first port P1 and the second port P2 via the first multiplexer 200 and the second multiplexer 202, and the first port P1 and the second port P2 are pulled high via the first switch 204 and the second switch 206 when the UART module 24 and the USB module 26 are in the default mode. Compared with the conventional baseband IC having four pins for the UART and USB function, the baseband IC 22 provides two pins for the UART and USB function via the pin sharing device 20. Furthermore, the pin sharing device 20 is installed in the baseband IC 22 so the signal distortion occurring when using high speed USB transmission can be avoided as much as possible.

Figure 3:
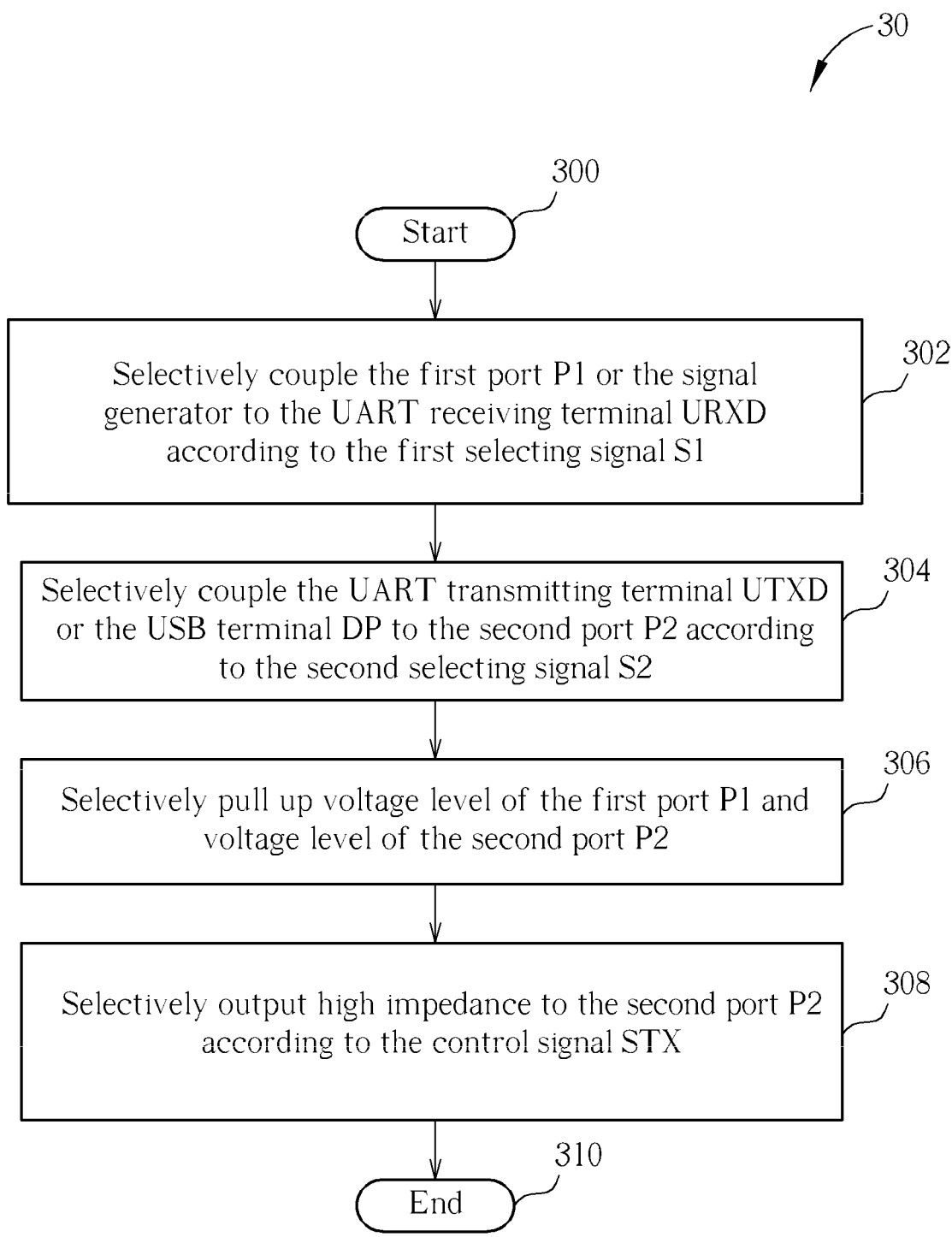
FIG. 3 is a flowchart of a pin sharing method according to an embodiment of the present invention.

Please refer to FIG. 3, which is an exemplary flowchart of a pin sharing method 30. The pin sharing method 30 can be used by the pin sharing device 20 shown in FIG. 2, which comprises the following steps:

Step 300: Start.
Step 302: Selectively couple the first port P1 or the signal generator 212 to the UART receiving terminal URXD according to the first selecting signal S1.
Step 304: Selectively couple the UART transmitting terminal UTXD or the USB terminal DP to the second port P2 according to the second selecting signal S2.
Step 306: Selectively pull up voltage level of the first port P1 and voltage level of the second port P2.
Step 308: Selectively output high impedance to the second port P2 according to the control signal STX.
Step 310: End.

In the pin sharing method 30, Step 302 describes operations of the first multiplexer 200; Step 304 describes operations of the second multiplexer 202; Step 306 describes operations of the first switch 204 and the second switch 206; Step 308 describes operations of the first buffer 208.

The pin sharing device 20 is one embodiment of the present invention; the circuit formed by the first switch 204, the second switch 206 and related pull-high resistors can be taken as an implementation of Step 306. Therefore, Step 306 further comprises: selectively couple the first port P1 to the first voltage generator VG1 according to the first switch signal SW1, and selectively couple the second port P2 to the second voltage generator VG2 according to the second switch signal SW2. The pin sharing method 30 intends to define operations of the pin sharing device 20, and Step 302 to Step 308 are not performed in an order. These steps can be performed at the same time or by different orders depends on different condition.

In conclusion, the pin sharing device and the pin sharing method according to the present invention can reduce I/O pins for implementing both UART and USB functions in an IC, which reduces cost and avoids signal distortion as much as possible.

Those skilled in the art will readily observe that numerous modifications and alterations of the device and method may be made while retaining the teachings of the invention.

What is claimed is:

1. A pin sharing device for a Universal Asynchronous Receiver/Transmitter (UART) module and a Universal Serial Bus (USB) module comprising:
   a first port, coupled to a first terminal of the USB module;
   a second port;
   a first multiplexer, for selectively coupling the first port or a signal generator to a receiving terminal of the UART module according to a first selecting signal;
   a second multiplexer, for selectively coupling a transmitting terminal of the UART module or a second terminal of the USB module to the second port according to a second selecting signal;
   a first switch, for selectively coupling the first port to a first voltage generator according to a first switch signal; and
   a second switch, for selectively coupling the second port to a second voltage generator according to a second switch signal.

2. The pin sharing device of claim 1, wherein when the first multiplexer couples the first port to the receiving terminal of the UART module according to the first selecting signal, the second multiplexer couples the transmitting terminal of the UART module to the second port according to the second selecting signal.

3. The pin sharing device of claim 1, wherein when the first multiplexer couples the signal generator to the receiving terminal of the UART module according to the first selecting signal, the second multiplexer couples the second terminal of the USB module to the second port according to the second selecting signal.

4. The pin sharing device of claim 1, wherein the signal generator is utilized for generating a control signal for keeping the receiving terminal of the UART module from floating and being affected by a USB signal on the first port when the USB module is coupled to a USB host device.

5. The pin sharing device of claim 1, wherein the first switch is switched on when the first multiplexer couples the first port to the receiving terminal of the UART module.

6. The pin sharing device of claim 1, wherein the first switch is switched off when the first multiplexer couples the signal generator to the receiving terminal of the UART module.

7. The pin sharing device of claim 1, further comprising a resistor coupled between the first switch and the first voltage generator.

8. The pin sharing device of claim 1, wherein the second switch is switched on when the second multiplexer couples the transmitting terminal of the UART module to the second port.

9. The pin sharing device of claim 1, wherein the second switch is switched off when the UART module is coupled to a UART device and the UART module is transmitting.

10. The pin sharing device of claim 1, wherein the second switch is switched off when the second multiplexer couples the second terminal of the USB module to the second port.

11. The pin sharing device of claim 1, further comprising a resistor coupled between the second switch and the second voltage generator.

12. The pin sharing device of claim 1, further comprising:
    a first buffer, coupled between the second multiplexer and the second port and controlled by a control signal; and
    a second buffer, coupled between the second terminal of the USB module and the second port.

13. The pin sharing device of claim 12, wherein the control signal is generated according to the first selecting signal, the second selecting signal, a USB transmitting enable signal indicating whether the USB module is transmitting and a UART transmitting enable signal indicating whether the UART module is transmitting.

14. The pin sharing device of claim 12, wherein when the UART module is not coupled to a UART device and the USB module is not coupled to a USB host device, the control signal controls the first buffer to output high impedance or output an input signal of the first buffer.

15. The pin sharing device of claim 12, wherein when the UART module is coupled to a UART device, the control signal controls the first buffer to output a UART transmitting signal to the second port when the UART module is transmitting or output high impedance when the UART module is receiving only.

16. The pin sharing device of claim 12, wherein when the USB module is coupled to a USB host device, the control signal controls the first buffer to output a USB signal to the second port when the USB module is transmitting or output high impedance when the USB module is receiving.

17. The pin sharing device of claim 1, wherein the first selecting signal is equal to the second selecting signal.

18. A pin sharing method for a Universal Asynchronous Receiver/Transmitter (UART) module and a Universal Serial Bus (USB) module for sharing a first port and a second port, wherein the first port is coupled to a first terminal of the USB module, the pin sharing method comprising:
    (a) selectively coupling the first port or a signal generator to a receiving terminal of the UART module according to a first selecting signal;
    (b) selectively coupling a transmitting terminal of the UART module or a second terminal of the USB module to the second port according to a second selecting signal; and
    (c) selectively pulling up voltage level of the first port and voltage level of the second port.

19. The pin sharing method of claim 18, wherein the step (c) comprises:
    (d) selectively coupling the first port to a first voltage generator according to a first switch signal; and
    (e) selectively coupling the second port to a second voltage generator according to a second switch signal.

20. The pin sharing method of claim 18, wherein the signal generator is utilized for generating a control signal for keeping the receiving terminal of the UART module from floating and being affected by a USB signal on the first port when the USB module is coupled to a USB host device.

21. The pin sharing method of claim 18, further comprising:
    (f) selectively output high impedance to the second port P2 according to a control signal.

22. The pin sharing method of claim 21, wherein the control signal is generated according to the first selecting signal, the second selecting signal, a USB transmitting enable signal indicating whether the USB module is transmitting and a UART transmitting enable signal indicating whether the UART module is transmitting.

23. The pin sharing method of claim 18, wherein when the first port is coupled to the receiving terminal of the UART module according to the first selecting signal, the transmitting terminal of the UART module is coupled to the second port according to the second selecting signal.

24. The pin sharing method of claim 18, wherein when the signal generator is coupled to the receiving terminal of the UART module according to the first selecting signal, the second terminal of the USB module is coupled to the second port according to the second selecting signal.

25. The pin sharing method of claim 18, wherein the first switch is switched on according to the first switch signal when the first port is coupled to the receiving terminal of the UART module according to the first selecting signal.

26. The pin sharing method of claim 18, wherein the first switch is switched off according to the first switch signal when the signal generator is coupled to the receiving terminal of the UART module according to the first selecting signal.

27. The pin sharing method of claim 18, wherein the second switch is switched on according to the second switch signal when the transmitting terminal of the UART module is coupled to the second port according to the second selecting signal.

28. The pin sharing method of claim 18, wherein the second switch is switched off according to the second switch signal when the UART module is coupled to a UART device and the UART module is transmitting.

29. The pin sharing method of claim 18, wherein the second switch is switched off according to the second switch signal when the second terminal of the USB module is coupled to the second port according to the second selecting signal.

30. The pin sharing method of claim 18, wherein the first selecting signal is equal to the second selecting signal.

* * * * *